(12) United States Patent
Tsunoda et al.

(10) Patent No.: US 7,303,136 B2
(45) Date of Patent: Dec. 4, 2007

(54) STORAGE DEVICE

(75) Inventors: Motoyasu Tsunoda, Sagamihara (JP);
Nagamasa Mizushima, Fujisawa (JP);
Kunihiro Katayama, Chigasaki (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/795,049

(22) Filed: Mar. 3, 2004

(65) Prior Publication Data

US 2004/0232247 A1    Nov. 25, 2004

(30) Foreign Application Priority Data

Mar. 6, 2003    (JP)    ............................. 2003-059305

(51) Int. Cl.
*G06K 19/06* (2006.01)
(52) U.S. Cl. ...................... 235/492; 235/487
(58) Field of Classification Search ................ 235/492; 439/60
See application file for complete search history.

(56) References Cited

U.S. PATENT DOCUMENTS 5,826,011 A * 10/1998 Chou et al. ................... 726/31
6,606,707 B1 * 8/2003 Hirota et al. ................ 713/172
6,669,487 B1 * 12/2003 Nishizawa et al. ........... 439/60

FOREIGN PATENT DOCUMENTS

JP    2001-325037    11/2001

* cited by examiner

*Primary Examiner*—Lisa Caputo
(74) *Attorney, Agent, or Firm*—Townsend and Townsend and Crew LLP (57) ABSTRACT

A storage device to store data includes an external interface, a controller, a nonvolatile memory, and an IC card. In response to a first indication from the external device, the controller receives a program to be executed in the IC card from the nonvolatile memory or the external device and writes the program in the IC card. In response to a second indication from the external device, the controller deletes the program written in the IC card.

19 Claims, 8 Drawing Sheets

| 301 | 302 | 303 CARD AP | | | | 307 HOST AP | |
|---|---|---|---|---|---|---|---|
| | | 304 | 305 | 306 | 308 | | 309 |
| AP NO. | TITLE | SIZE | STATE | STORAGE POSITION (ADR,SECTORS) | SIZE | | STORAGE POSITION (ADR,SECTORS) |
| 1 | SHOPPING | 1kB | Active | (1000,2) | 100kB | | (1002,200) |
| 2 | NETWORK CONNECTION | 5kB | Active | (1000,10) | 200kB | | (2010,400) |
| 3 | GAME | 10kB | Usable | (1000,20) | 500kB | | (4020,1k) |
| ... | ... | ... | ... | ... | ... | | ... |

| | 401 | | 402 |
|---|---|---|---|
| | MEMORY CARD COMMAND NO. | | DATA |

| TITLE | | SETTING VALUE | | CONTENTS |
|---|---|---|---|---|
| MEMORY CARD COMMAND NO. | | | | |
| | 403 — COMMAND | 408 — | sec_w | SECURE WRITE COMMAND |
| | | 409 — | sec_r | SECURE READ COMMAND |
| | | 410 — | ins | AP PROCESSING COMMAND |
| | 404 — PARAMETER | 411 — | pr_00 | ACTIVATE CARD AP (Active_AP) SPECIFIED IN Data FIELD |
| | | 412 — | pr_01 | DELETE CARD AP (Active_AP) SPECIFIED IN Data FIELD |
| | | 413 — | pr_02 | DELETE CARD AP (Usable_AP) SPECIFIED IN Data FIELD |
| | | 414 — | pr_10 | NOP |
| | | 415 — | pr_11 | TRANSFER HOST AP SPECIFIED IN Data FIELD TO HOST |
| | | 416 — | pr_12 | DELETE HOST AP SPECIFIED IN Data FIELD |
| DATA | 405 — Lc | 417 — | lc_x | COMMAND LENGTH |
| | 406 — Data | 418 — | dt_x | APPLICATION NO., CARD AP, HOST AP STORAGE POSITION |
| | 407 — Le | 419 — | le_x | RESPONSE LENGTH |

| AP NO. | TITLE | SIZE | CARD AP | | HOST AP | |
|---|---|---|---|---|---|---|
| 301 | 302 | 304 | STATE 305 | STORAGE POSITION (ADR,SECTORS) 306 | SIZE 308 | STORAGE POSITION (ADR,SECTORS) 309 |
| 0 | AP PURCHASE | 1kB | Active | (500,2) | 100kB | (502,200) |
| 4 | MUSIC | 50kB | Unusable | (8000,100) | 700kB | (8100,1.4k) |
| ... | ... | ... | ... | ... | ... | ... |

303 — CARD AP
307 — HOST AP
119

STORAGE DEVICE

BACKGROUND OF THE INVENTION

The present invention relates to a storage device including a security function and a host device connectible to the same and to a storage device and a host device associated therewith to control management and execution of application software.

An integrated circuit (IC) card is a memory card used in a system requiring high security processing, for example, in a system of credit settlement and banking processing. Usability of an IC card is improved for the user by installing in the IC card a function called "dynamic loading" which loads a plurality of application programs in the card and which additionally loads application programs in the card after issuance thereof.

In the installation of an application program by the dynamic loading, it is required to make a check to prevent an illegal use thereof. That is, validity is checked both for the application program, and for the IC card. Only when both of them are valid, the application can be installed in the card. Japanese Patent Publication No. 2001-325037 describes a method in which to secure safety in the situation described above, a terminal device dedicated to a service provider is used for the purpose or a user terminal is used to conduct authentication and installation of application between a server and an IC card via a network.

In the installation of application using a dedicated terminal described above, it is required for the user to visit an installation place of the terminal. Or, it is required that the card is delivered to the place of the terminal and then the card is returned to the user. That is, the physical movement of the IC card imposes a heavy load onto the user and the service provider and hence there arises a problem of lower usability of the IC card. In the installation via a network, the physical movement of the IC card is prevented by using a terminal of the user. However, each time application is installed or deleted, it is required to connect the terminal to the server on a specified network. This leads to a problem that the operation is troublesome and the load of the server is increased. For example, in a case in which the IC card includes a plurality of application programs in advance, when the IC card does not have a sufficient area to additionally install a new application program therein, it is required for the user to delete at least one application program existing in the card before the new application program is installed. For this purpose, it is necessary to connect the terminal to the server for each operation. To restore the deleted application program, it is required for the user to request the application provider to install the application program again. This is troublesome for the service provider and the user.

SUMMARY OF THE INVENTION

It is therefore an object of the present invention to provide a storage device and a host device associated therewith having a high level of security and high usability in the management of installation and deletion of application in and from the storage device such as an IC card and a memory card.

According to one aspect of the present invention, there is provided a storage device including an external interface such as an external terminal, a controller, a nonvolatile memory such as a flash memory chip, and an IC. The controller includes a unit which receives from the nonvolatile memory or the external device in response to an indication from the external device connected via the external interface a program to be executed by the IC and which sends the program to the IC. The controller also includes a unit which requests in response to an indication from the external device the IC to delete the program having been written therein.

The controller includes a unit to determine validity of the IC before conducting writing or deletion of a program for the IC. The controller also includes a unit to determine validity of a program received from the controller and writes the program in the IC if the program is valid.

According to one aspect of the present invention, there is provided a storage device having a high level of security and high usability. Therefore, it is possible to construct a system suitable for the service provider and the user.

DETAILED DESCRIPTION OF THE EMBODIMENTS

Figure 1:
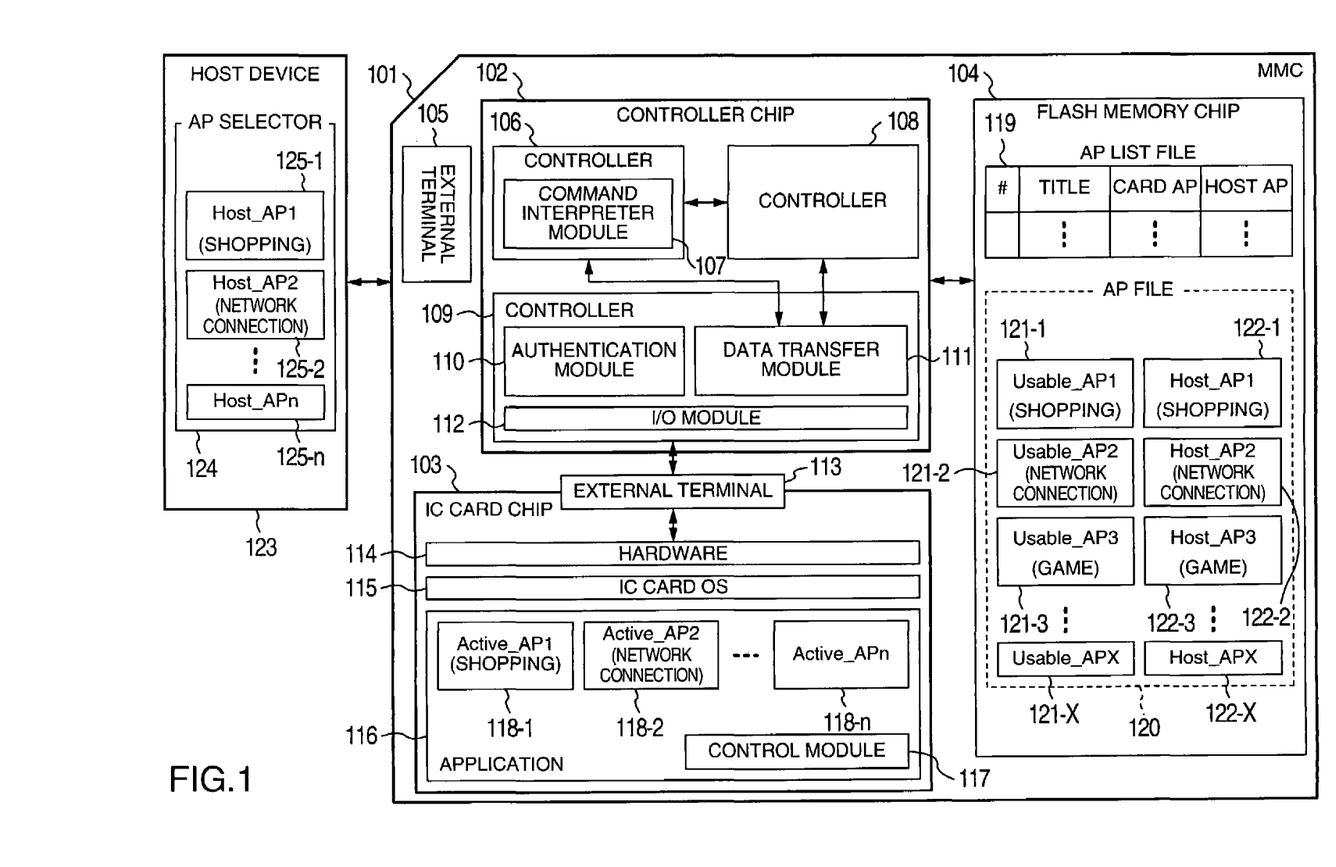
FIG. 1 is a block diagram showing an internal configuration of a memory card according to the present invention.

FIG. 1 shows an internal configuration of a memory card 101 according to the present invention. The memory card 101 is a device to execute, when a host device 123 connected thereto issues a memory card command, various processing such as data writing, data reading, and/or security processing. The host device 123 is, for example, a portable telephone, a personal digital assistant (PDA), a personal computer, a music reproducing (and recording) device, a still camera, a video camera, or an automatic teller machine (ATM). According to the present invention, when an application program of an IC card is installed in or deleted from the memory card 101, the memory card 101 executes processing in response to an indication from the host device 123. An outline of the processing will now be described.

The memory card 101 includes an external terminal (external interface) 105, a controller chip 102, a flash memory chip 104, and an IC card chip 103. The flash memory chip 104 is a memory chip including a nonvolatile semiconductor memory as a storage medium. Data can be read from the flash memory chip 104 using a flash memory command. Data can be written in the flash memory chip 104 using a flash memory command. The IC card chip 103 includes a function such as a cryptography encoding (encrypting) and decoding (decrypting) function necessary for security processing. The chip 103 is a chip such as a microcomputer chip installed in a plastic substrate of an IC card. The controller chip 102 is connected to other constituent components in the memory card 101 such as the external terminal 105, the flash memory chip 104, and the IC card chip 103. By controlling these constituent components, the controller chip 102 processes memory card commands issued from the host device 123. The external terminal 105 includes a group of terminals to communicate information with the host device 123. The IC card chip 103 has a Tamper-resistance stronger than that of the controller chip 102 and the flash memory chip 104.

Application programs of the IC card ordinarily provide various services by operating in cooperation with application programs in the host device 123. In the example of FIG. 1, application programs are installed in the host device 123 and the IC card chip 103 in the memory card 101. For example, to achieve a shopping service, Host_AP1 (125-1) is installed in the host device 123 and Active_AP1 (118-1) is installed in the IC card chip 103. The shopping service in this case is a service of virtual shopping on the internet via the host device 123 or a service of shopping in which the user purchases articles by communicating with a dedicated terminal, e.g., a point of sales (POS) terminal actually installed in a store using a wireless function of the host device 123. Ordinarily, an IC card application program is a program to execute input/output control and computation for data having a high secret level for an external device. For example, in the shopping service, Active_AP1 (118-1) executes processing, for example, calculates the balance of electronic money as a result of the purchase to save the result in safety. It is required to consider security in the management of installation and deletion of such application programs. In the present embodiment, after authentication is conducted between the controller chip 102 and the IC card chip 103, an IC card chip program is installed or deleted to thereby secure the safety.

Figure 2:
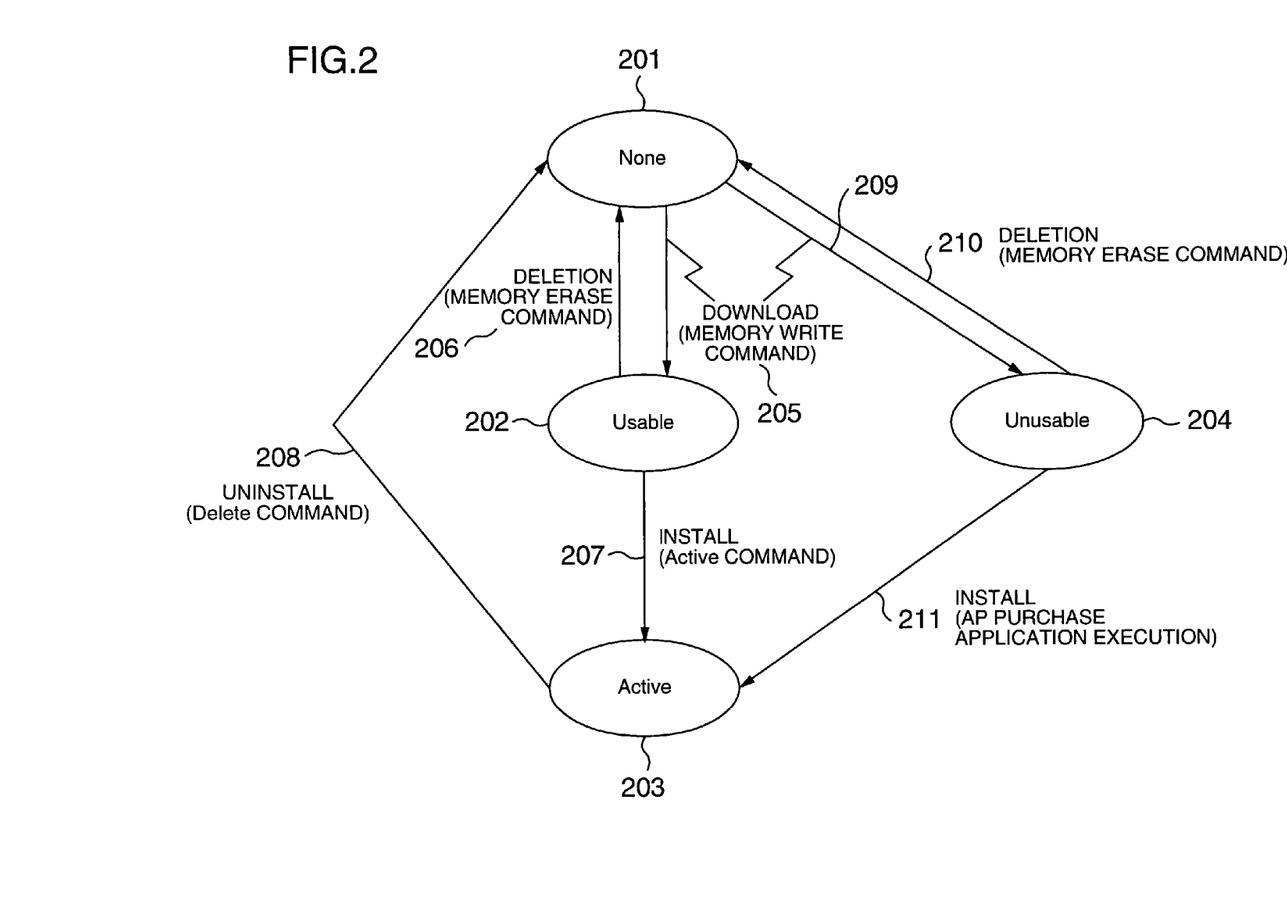
FIG. 2 is a diagram showing state transitions of IC card application programs according to the present invention.

In the embodiment, names of states (None 201, Usable 202, Active 203, Unusable 204) are defined according to positions of respective IC card application programs. FIG. 2 shows state transitions. None 201 indicates that the pertinent application program file is absent. Usable 202 indicates that the pertinent application program file can be installed in the IC card chip 103 although the file has not been installed in the IC card chip 103. Such a file appears when the file is written, for example, by a memory write command 205 from the host device 123 into the flash memory chip 104. In FIG. 1, the flash memory chip 104 stores Usable_AP121 in the application (AP) file 120, which will be described in detail later. Active 203 indicates that the pertinent application program file has been installed in the IC card chip 103 and is in an executable state. Such a file can be obtained, for example, by installing 207 the usable file in response to an install indication from the host device 123. To delete a program file in a usable state, the host device 123 issues a memory erase command 206. To delete a program file in an active state, the host device 123 issues an uninstall command 208. In this operation, if an associated usable file (Usable_AP121) remains in the application file 120, the host device 123 can restore, by the install command 207, the active program file which has been installed and which has been deleted as above. Unusable 204 will be described in conjunction with a subsequent embodiment.

Description will now be given in detail of the configuration and operations of the embodiment.

In FIG. 1, the controller chip 102 includes a controller 106 for the host device 123 and a controller 108 for the flash memory 104, and a controller 109 for the IC card chip 103. The controller 106 executes processing for communication of a card command via the external terminal 105 with the host device 123. The controller 106 includes a command interpreter module 107 to interpret the command and notifies a result of the interpretation to the controllers 108 and 109. When the result indicates an access to the flash memory chip 104, the controller 108 issues an indication such as a data read/write indication to the flash memory chip 104, and then returns a result of the indication to the controller 106. The controller 109 includes an I/O module 112 to control input and output operations between the data transfer module 111 controlling data transfer operations and the IC card chip 103 and an authentication module 110 to conduct mutual authentication with the IC card chip 103. When the result of the command interpretation indicates an access to the IC card chip 103, the controller 109 issues an IC card command via the data transfer module 111 and the I/O module 112 to the IC card chip 103, and then returns a result (response) of the command to the controller 106. The data transfer module 111 also controls data transfer operations between the IC card chip 103 and the flash memory chip 104. This is used to execute processing, for example, to install an IC card application program using the flash memory chip 104, which will be described later in detail.

The IC card chip 103 is connected via the external terminal 113 to the controller chip 102. The external terminal 113, the electric signal protocol, and commands favorably conform to the ISO/IEC7816 Standards. To guarantee a high security level, it is also possible to use an IC card chip 103 authenticated by an evaluation and authentication organization of the international standards for security evaluation ISO/IEC15408. The IC card chip 103 includes an IC card operating system (OS) 115 and an application unit 116. Hardware 114 includes a central processing unit (microcomputer) to conduct computation, a read only memory (ROM), a random access memory (RAM), and an electrically erasable programmable ROM (EEPROM) to store programs and other items, and an encryption co-processor to execute processing for encryption and decryption. The IC card operating system 115 is desirably an OS (operating system) to cope with a plurality of applications. The operating system 115 includes a function (firewall function) which prevents erroneous operations caused by interference between an application selector 124 for the user to select one of the IC card application programs and IC card application programs, and which prevents secret information from being decoded without permission. The user can receive a plurality of services using one memory card 101. The application unit 116 includes a plurality of application programs Active_AP1 118-1 to Active_APn 118-n and a control module 117 to control processing, for example, for installation and deletion of application programs. The control module 117 includes a dynamic loading function for installation and deletion of application of the card after issuance of the card. Desirably, the control module 117 conducts a card control operation conforming to, for example, Global Platform standards and MULTOS standards.

The flash memory chip 104 stores an application file 120 and an application list file 119. The application file 120 includes for each service an IC card application program (Usable_AP 121) installable in the IC card chip 103 and an associated application program (Host_AP 122) for the host device 123. These files are supplied from the service provider to each user. Security processing such as encryption is beforehand executed for Usable_AP 121 so that the control module 117 of the IC card chip 103 verifies its validity. This is implemented to keep secrecy of Usable_AP 121 to prevent falsification thereof. Consequently, it is quite difficult that a third person rewrites data to modify the contents of Usable_AP 121 and installs Usable_AP 121 after modification and a third person arbitrarily installs Usable_AP 121 in other memory cards. On the other hand, since Host_AP 122 does not directly process data with a high secret level, the security processing used for Usable_AP 121 is not required for Host_AP 122. However, if a copy preventive function is required in consideration of protection of a software copyright, it is possible to beforehand execute the security processing such as encryption for Host_AP 122. The application list file 119 is a file indicating the layout and the contents of the application file 120. The host device 123 can read the file 119 to recognize the state of each application program stored in the memory card 101.

Figure 3:
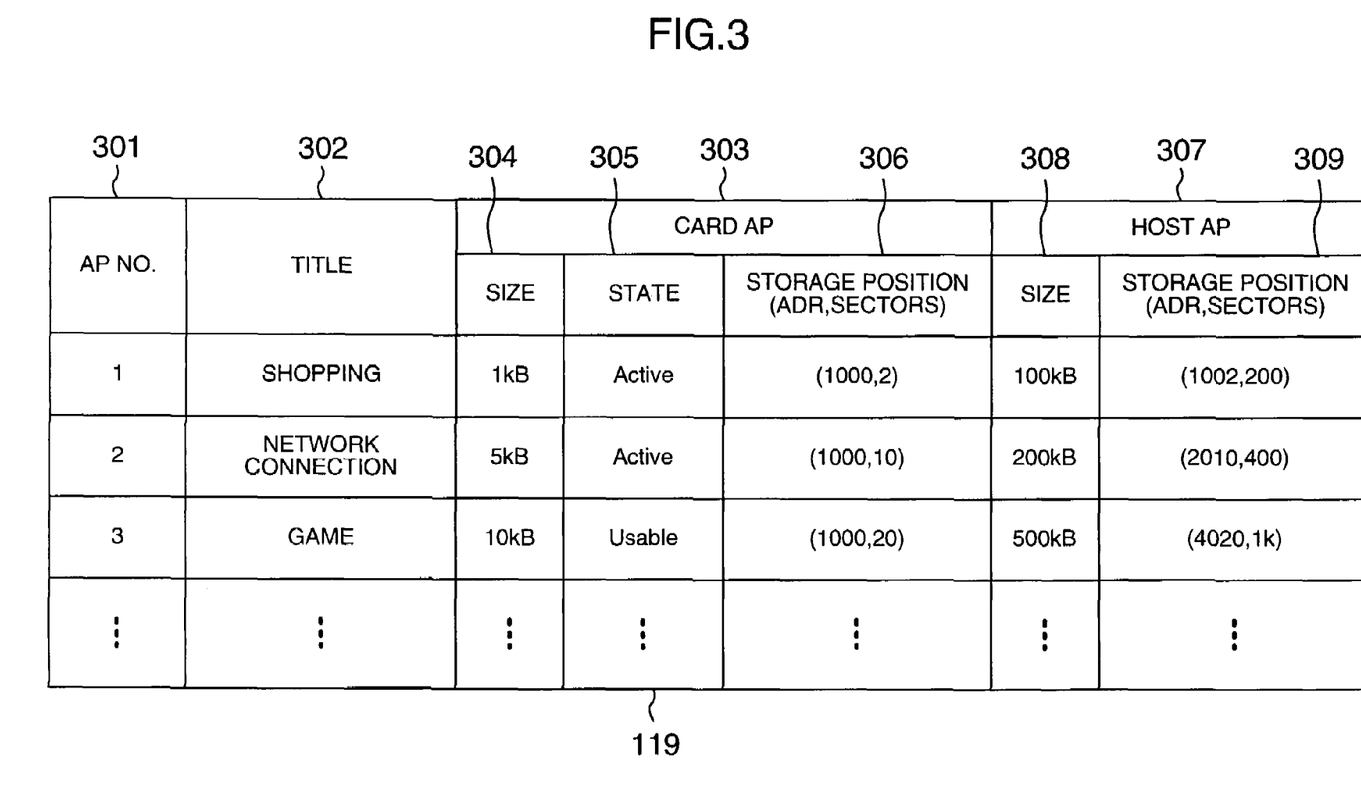
FIG. 3 is a table showing an application list file according to the present invention.

FIG. 3 shows an example of the application list file 119. Three services, i.e., "shopping", "network connection", and "game" are registered to the file 119. For each service, file size values (304, 308) and program storage positions (306, 309) are indicated for card application 303 and host application 307. For the card application 303, a state of an IC card application is indicated. In the example, "shopping" and "network connection" are in an active state. That is, each application is beforehand installed in the IC card chip 103 and can be immediately used. "Game" is in a usable state indicating that the application can be used immediately after its installation in the IC card chip 103.

The host device 123 can read the application file 120 using an ordinary memory read command. To implement a higher security level, the application file 120 may be stored in a memory control area from which the file 120 cannot be read using an ordinary command. In such a situation, the program storage positions (306, 309) are defined using, for example, the value of a sector address in the control area.

Figure 4:
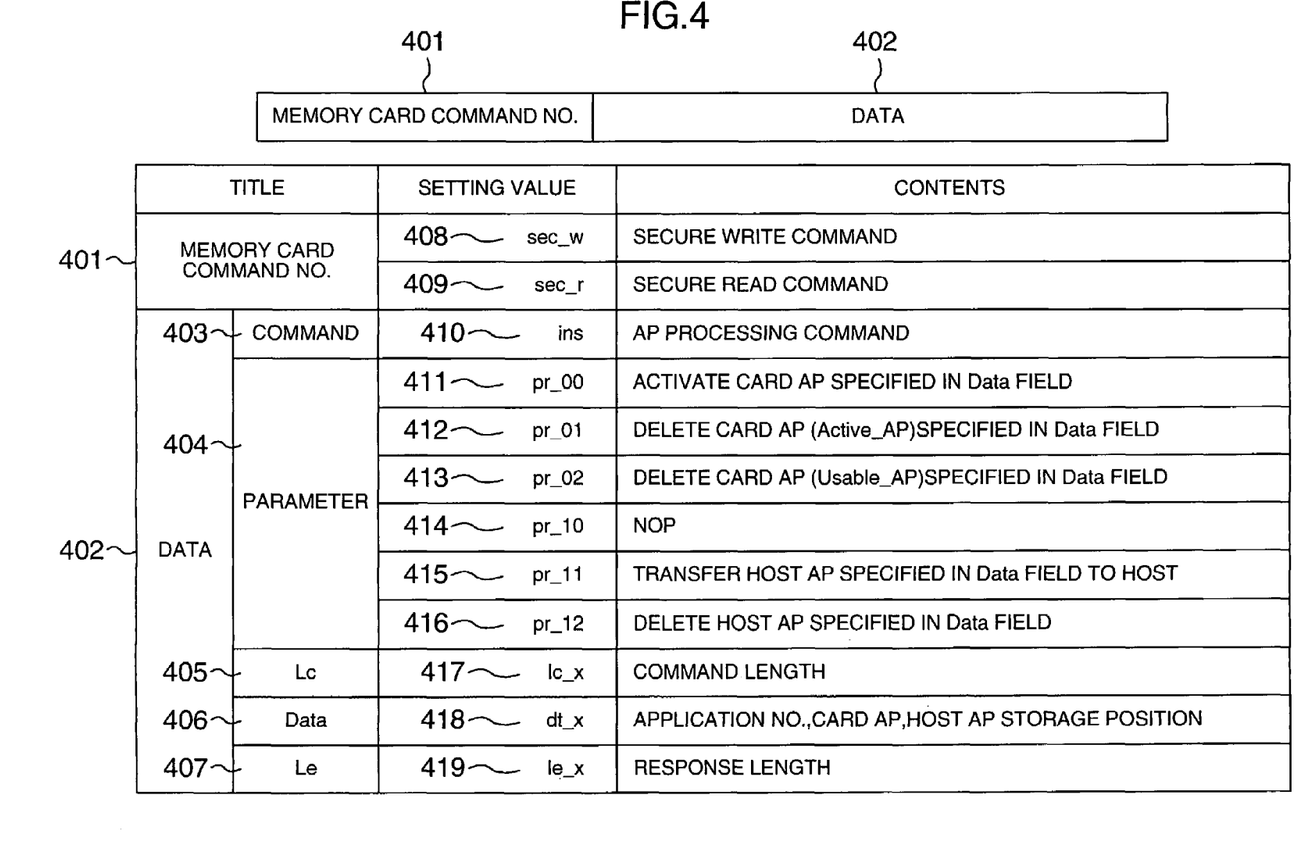
FIG. 4 is a diagram showing a memory card command format according to the present invention.

To execute a service requested by the user, the host device 123 refers to the application list file 119 to issue a memory card command suitable for the service to the memory card 101. FIG. 4 shows an example of a format of the memory card command. The command format includes a memory card command number 401 and data 402. The command number 401 is beforehand assigned to an associated command. Details of the indication of the command are described in the data field 402. In addition to the commands such as commands for initialization of the card and a data read or write operation from or to the flash memory chip 104, the system stipulates commands associated with an access to the IC card chip 103. To issue a command to the IC card chip 103, a secure write command (sec_w 408) is used. To receive a result (response) of a command issued to the IC card chip 103, a secure read command (sec_r 408) is used. In this operation, a command or response for the IC card chip 103 is set to the data 402. For a command for the application control or management such as the installation or deletion of an IC card application program, the data 402 is defined, for example, as below.

To a command field 403 of the data 402, ins 410 is set to indicate that the command is an application processing command. To install or activate an IC card application program (Usable_AP 121), pr_00 411 is set to the parameter field 404. To delete an application program in an active state (an installed application program), pr_01 412 is set to the parameter field 404. To delete Usable_AP 121 from the application file 120, pr_02 413 is set to the parameter field 404. To transfer the host application program (Host_AP 122) specified in the data field 406 to the host device 123, pr_11 415 is set to the parameter field 404. To delete Host_AP 122 from the application file 120, pr_12 416 is set to the parameter field 404. A command length Lc_x 417 is set to an Lc field 405. To select the processing object, an application number 301 set to the application list file 119 and storage positions (dt_x 418) of card and host application programs are set to the data field 406. An expected value le_x 419 of the length of a response to the command is set to an Le field 407. An IC card command format conforming the ISO/IEC standards is directly applicable for the data 402. Specifically, the command field is assigned to the APDU CLA, INS field, the parameter field 404 is assigned to the P1,P2 field, Lc 405 is assigned to the LC field, the data field 406 is assigned to the DATA field, and the Le field 407 is assigned to the LE field.

Figure 5:
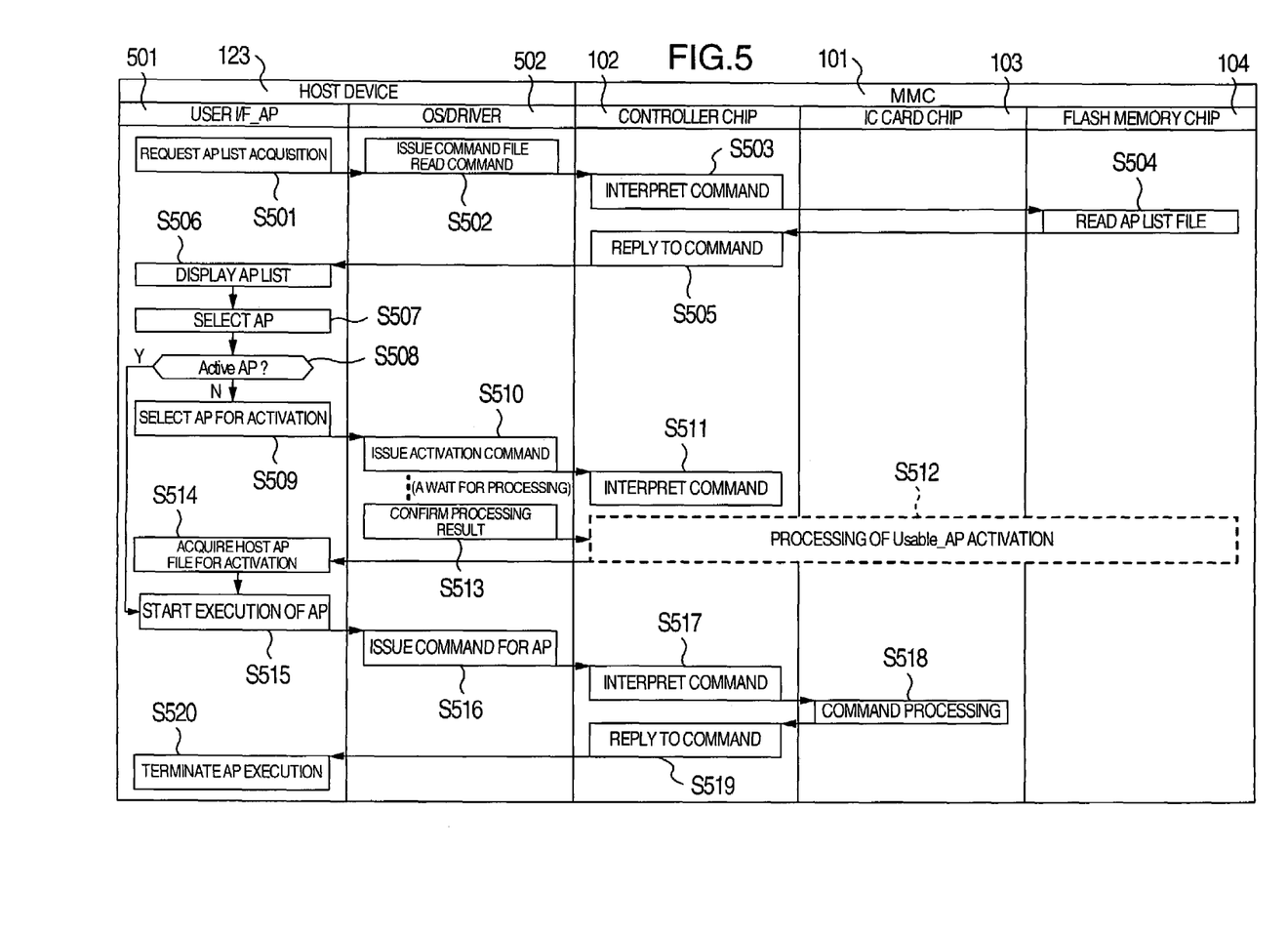
FIG. 5 is a flowchart showing an overall operation according to the present invention.

Description will now be given in detail of the use method and the contents of processing of the memory card 101. The flowchart of FIG. 5 shows operations when the host device 123 executes an application program using the memory card 101. The host device 123 includes a user interface application program (user I/F_AP 501) operated by the user and an operating system/driver 502 to execute an access to the memory card 101. On the other hand, the memory card 101 includes the controller chip 102, the IC card chip 103, and the flash memory chip 104 as shown in FIG. 1. The user first conducts an operation to display by user I/F_AP 501 a list of application programs which the host device 123 can process. In response to the operation, user I/F_AP 501 instructs OS/driver 502 to obtain the application list file 119 from the memory card 101 (step 501). OS/driver 502 issues a file read command to the memory card 101 (step 502). Having received the command, the controller chip 102 of the memory card 101 interprets the command by the command interpreter module 107. Since the command indicates a file read request to the flash memory chip 104, the indication is sent via the controller 108 to the flash memory chip 104 (step 503). The chip 104 reads the file 119 and sends the file 119 to the controller chip 102 (step 504). As a response to the command, the controller chip 102 sends the file 119 to the host device 123 (step 505). User I/F_AP 501 displays an application list using the file 119 received from the chip 102 (step 506).

The contents to be displayed may be only titles 302 shown in FIG. 3 or may be the titles 302 with description thereof and a state of each application (installed or not installed in the IC card). The processing may be automatically executed when the memory card 101 is inserted in the host device 123. In this case, the host device 123 senses an event of insertion of the memory card 101, reads a file of user I/F_AP 501 from the memory card 101, and executes user I/F_AP 501. As a result, the application list is displayed without any operation of the user. The user selects desired application from the application list (step 507). User I/F_AP 501 checks the state of the card application of the selected application (step 508). If it is active (the card application is beforehand installed in the IC card chip 103), user I/F_AP 501 executes the application selected by the user (step 515). If it is not active, user I/F_AP 501 selects target application (step 509) and issues to the memory card 101 a command to activate (install) the application program (step 510).

Specifically, the command is issued by setting necessary items to the respective fields as follows: sec_w 408 to the memory card command number 401, ins 410 to the command field 403 of the data 402, pr_00 411 and pr_11 415 to the parameter field 404, the command length lc_x 417 to the Lc field 405, the application number 301 to the data field 406 (assuming that the fourth game in other than the active state is selected in this example), and the response length le_x 419 to the Le field 407. The controller chip 102 of the memory card 101 interprets the command as described above (step 511), resultantly recognizes that the command indicates a transfer operation of Host_AP file 122-3 to the host device 123 for IC card application program installation, and executes processing to set Usable_AP 121-3 to an active state (step 512). The processing will be described later in detail. If the installation is successfully terminated, the host device 123 can obtain the specified file, i.e., Host_AP file 122-3 (step 514) and executes the application program selected by the user (step 515). When it is required to access the IC card chip 103 during the execution of the application program, the host device 123 issues a secure write command 408 via the OS/driver 502 (step 516). This is used, for example, in a system in which results such as scores of a game application program are saved in the IC card chip 103 in a secured state preventing falsification of the contents thereof. The controller chip 102 of the memory card 101 similarly interprets the command (step 517) to resultantly recognize that the command indicates an access to the activated IC card application program, and sends the command to the IC card chip 103. Having received the command, the IC card chip 103 processes the command (step 518) and sends a result (response) of the command to the controller chip 102. The controller chip 102 then notifies a result of processing as a response to the command to the host device (step 519). This resultantly terminates the application (step 520).

Figure 6:
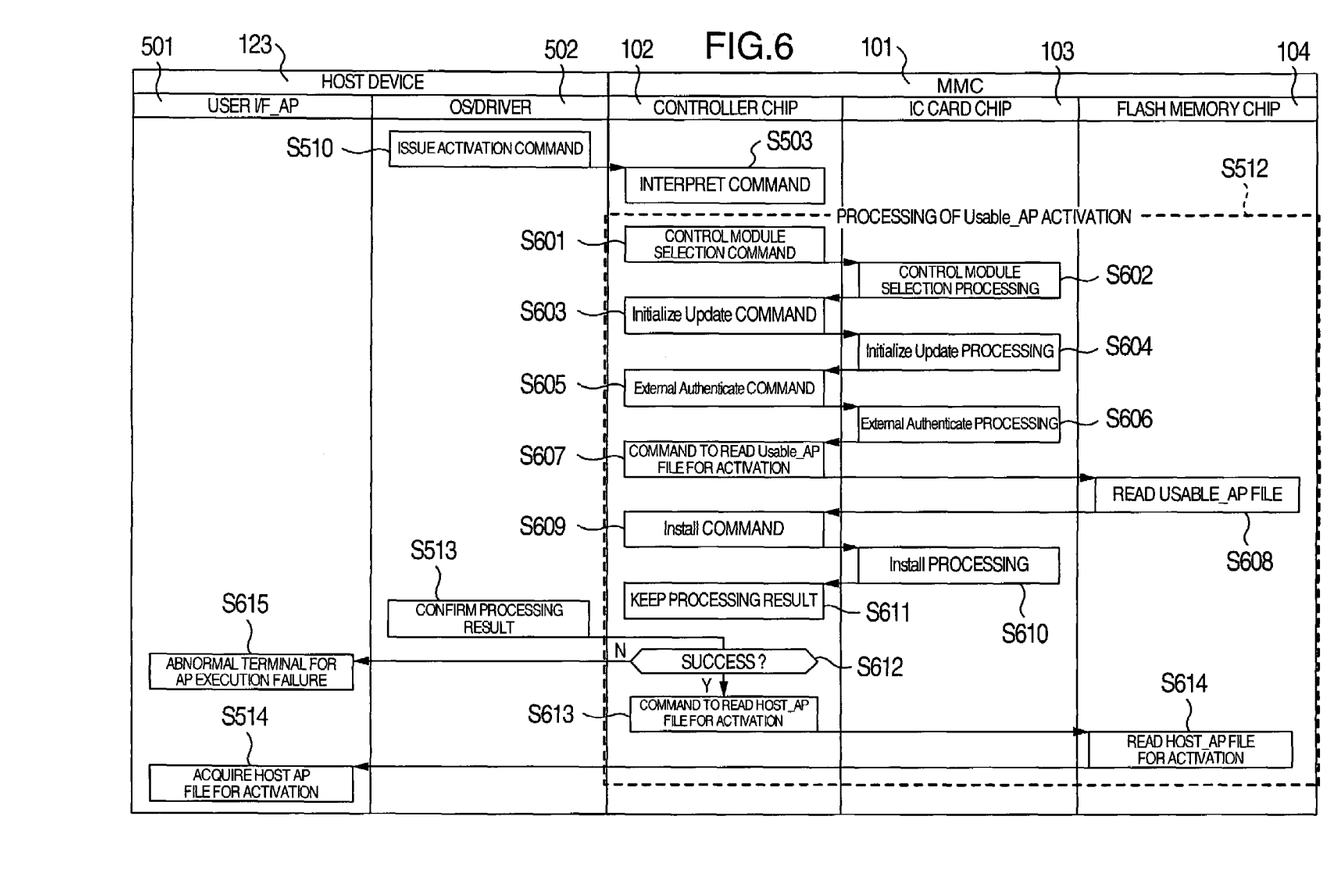
FIG. 6 is a flowchart showing an activation processing according to the present invention.

FIG. 6 shows the activation processing of Usable_AP 121-3 in a flowchart. When the host device 123 issues an activation command (step 510), the controller chip 102 of the memory card 101 interprets the command (step 503), and issues, to install an IC card application program, a command to select the control module 117 to the IC card chip 103 (step 601). The selection command desirably conforms to the IC card commands stipulated by the ISO/IEC7816 standards. Having received the command, the IC card chip 103 selects the control module 117 to start conducting preparation for the program installation (step 602). Next, processing is executed between the controller chip 102 and the IC card chip 103 for initialization in steps 603 and 604 and for external authentication in steps 605 and 606. As a result, the IC card chip 103 is regarded as valid and the system is now ready for the program installation. The controller chip 102 instructs the flash memory chip 104 to read Usable_AP file 121-3 to be set to an active state from the application file 120 (step 607). Having received the instruction, the flash memory chip 104 reads the target file 121-3 and transfers the file 121-3 to the controller chip 102 (step 608). The controller chip 102 receives Usable_AP 121-3 and issues an indication of program installation using Usable_AP 121-3 (step 609). In response to the indication, the IC chip card 103 executes processing for the program installation (step 610). In the installation processing, a check is made to determine validity of Usable_AP 121-3 and a result of the check is notified to the controller chip 102 to be kept therein (step 611). The host device 123 issues a secure read command 409 to confirm the result of the check (step 513). Having received the command 409, the controller chip 102 makes a check to determine whether or not the processing has been successfully terminated (step 612). If the result indicates a successful termination, the controller chip 102 instructs the flash memory chip 104 to read Host_AP3 122-3 corresponding to or paired with the IC card application program in the active state, i.e., Usable_AP3 121-3 (step 613). In response to the instruction, the flash memory chip 104 transfers the target file, namely, Host_AP3 122-3 to the host device 123 (step 614). The host device 123 then receives Host_AP3 122-3 (step 514). In this operation, the readout of Host_AP3 122-3 may be beforehand sent to the flash memory chip 104 when the installation processing is successfully terminated. If the installation fails, the condition is notified to the host device 123, and the execution of the application program selected by the user abnormally terminates (step 615).

Next, another embodiment of the present invention will be described.

In the embodiment of a model, a service provider sells application programs of the IC card chip 103 to the user through the memory card 101. As can be seen from FIG. 2, it has been defined in the preceding embodiment that each application program of the IC card chip 103 is in the state of "None 201", "Usable 202", or "Active 203". In addition to the states, a state of "Unusable 204" is additionally defined in the present embodiment.

A file in an unusable state is obtained by encrypting file in a usable state. To decrypt the encrypted file, a decoding or decrypting key supplied from the service provider is required. Therefore, the unusable file in the unusable state cannot be directly installed in the IC card chip 103. First, an IC card application program (an application purchasing application program) to decode or decrypt an unusable file with the decrypting key is executed for the file in the unusable state. Then, the file thus decoded can be installed in the IC card chip 103.

Figure 7:
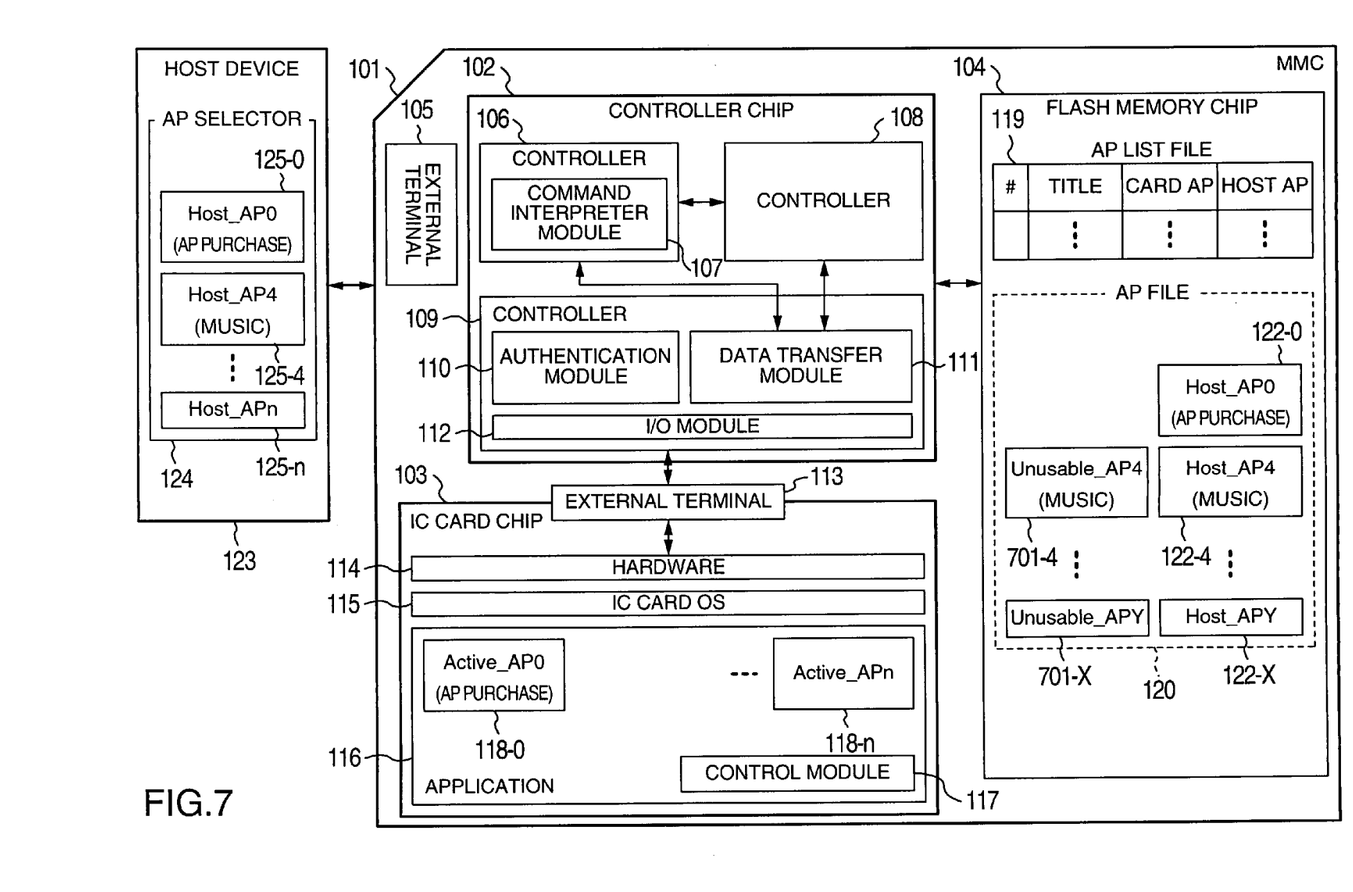
FIG. 7 is a block diagram showing another internal configuration of a memory card according to the present invention.

FIG. 7 shows an internal configuration of the memory card 101 according to the model. The IC card chip 103 includes the application purchasing application program Active_AP0 118-0 beforehand installed therein. The service provider or a card issuing firm beforehand installs Active_AP0 118-0 in the memory card 101 before delivering the memory card 101 to the user. The flash memory chip 104 stores the application file 120 including Unusable_AP 701 (also Host_AP 122 as in the preceding embodiment). The application file 120 does not contain data with a high secret level and hence can be distributed without any particular condition for the following reason. Even when the user obtains only Host_AP 122, Host_AP 122 cannot be normally operated if an associated card application program is not installed. The user cannot receive the service as a result. Therefore, the service provider or the card issuing firm can deliver the application file 120 stored in the memory card 101 or can freely distribute the application file 120 via, for example, the internet to users to efficiently carry out business.

Figure 8:
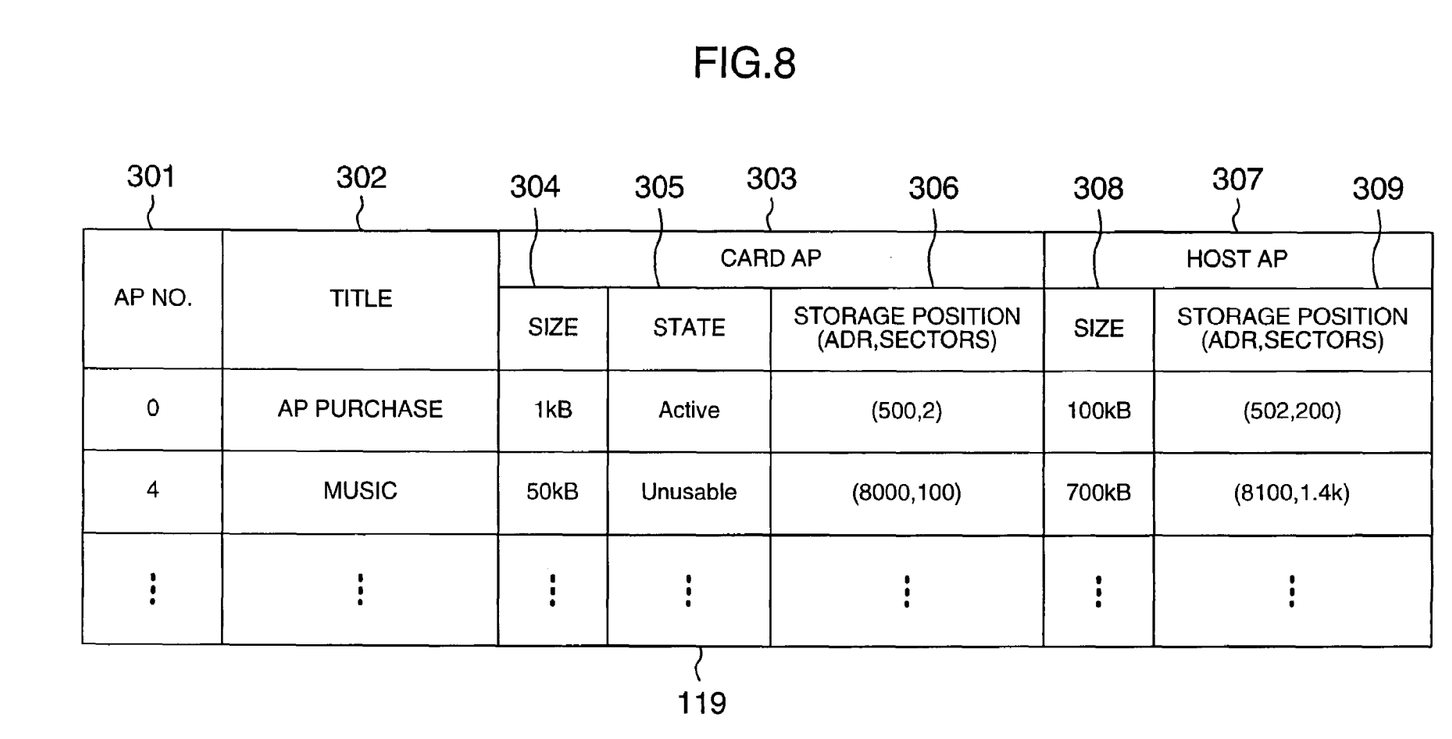
FIG. 8 is a table showing another application list file according to the present invention.

FIG. 8 shows the contents of the application list file 119 in the embodiment. An application program "application purchase service" is in the active state, namely, is beforehand installed. An application program "music service" is in an unusable state. The application of the application purchase service may be, for example, as follows. A point value is beforehand set and is stored in a secured state. When an application program is purchased, a point value corresponding to the price of the application program is subtracted at installation of Unusable_AP 701 from the point value beforehand stored. The point value may be settled by directly paying in cash through a particular terminal or by transferring an associated amount of money from a bank account of the user via the internet. The music service application provides, for example, a service to decrypt an encrypted music content or a service to share part of a function to execute the decryption processing in cooperation with the controller chip 102 in the memory card 101.

Description will now be given in detail of the use method and operations of the memory card 101 in the music service application. The user initiates an application, Host_AP4 125-4, of the host device 123 to receive the music service.

Host_AP4 125-4 accesses the application list file 119 of the memory card 101 to recognize that an application Active_AP4 118-4 is not installed in the IC card chip 103 and Unusable_AP4 701-4 exists in the flash memory chip 104. Host_AP4 125-4 then initiates the application purchase application program Host_AP0 125-0. Host_AP0 125-0 indicates the memory card 101 to execute installation processing for Unusable_AP4 701-4. In response to the indication, the memory card 101 initiates Active_AP0 118-0 of the IC card chip 103. Active_AP0 118-0 requests the controller chip 102 to conduct preparation for installation to install Unusable_AP4 701-4. The preparation for installation indicates processing such as selection of the control module (steps 601 and 602), initialization (steps 603 and 604), and authentication (steps 605 and 606) as described in conjunction with the preceding embodiment by referring to FIG. 6. Thereafter, the controller chip 102 transfers Unusable_AP4 701-4 to the IC card chip 103 and instructs the installation. By using Active_AP0 118-0, the IC card chip 103 decodes Unusable_AP4 701-4 and regards a result of the decoding as a program to be installed. In the subsequent processing as in that shown in FIGS. 5 and 6, an IC card application program is installed for the music service and hence the user can enjoy the service.

In the embodiments described above, the memory card 101 has an internal configuration including a controller chip 102, an IC card chip 103, and a flash memory chip 104 by way of illustration. However, the present invention is naturally applicable even when these chips are integrated with each other. For example, the controller chip 102 and the IC card chip 103 are integrated into one chip. That is, the configuration includes the integrated chip and the flash memory chip 104.

In the description of the embodiments, the present invention is applied to a memory card 101. However, the present invention can be naturally applied to other memory cards such as a multimedia card (MMC: a registered trademark), a secure digital card (SDC: a registered trademark), a memory stick (a registered trademark of Sony), and a compact flash (a registered trademark). Also, the present invention is applicable to devices including a nonvolatile memory function such as a hard disk device and an optical disk device.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage device, comprising:
an external interface to connect the storage device to an external device;
a nonvolatile memory chip having stored therein a plurality of programs;
a controller chip for controlling the nonvolatile memory; and
an IC that can execute one of the programs,
wherein the nonvolatile memory, the controller, and the IC are respectively formed as separate semiconductor chips,
wherein the controller is configured to be connected to the external interface, the nonvolatile memory and the IC, to interpret a first instruction received from the external device through the external interface, and to access the nonvolatile memory or the IC in accordance with a result of the controller interpreting the first instruction, wherein the nonvolatile memory is connected to the controller, the programs stored in the nonvolatile memory being configured to perform predetermined processing including security processing to be operable in the IC in cooperation with application programs in the external device,
wherein the IC includes a CPU, ROM, RAM, and EPROM, and is connected to the nonvolatile memory through the controller,
wherein the IC has a tamper-resistance stronger than tamper-resistances of the controller and the nonvolatile memory,
wherein the controller is further configured to instruct the IC to run one of the programs when the first instruction is interpreted as an access to said one of the programs, and to transmit information on a performance result of said one of the programs to the external device,
wherein the controller is further configured to determine validity of the IC to transmit said one of the programs to the IC when the IC is determined to be valid,
wherein the IC performs a check to determine validity of the transmitted program and installs the transmitted program in the IC when the transmitted program is determined to be valid.

2. The storage device according to claim 1, wherein the controller is further configured to instruct the IC to uninstall the transmitted program in response to a second instruction from the external device.

3. A storage device according to claim 1, wherein the nonvolatile memory stores therein:
a first program to be executed by the IC;
a second program corresponding to the first program to be executed by the external device; and
a program list indicating at least a storage position of the first program in the nonvolatile memory and a storage position of the second program in the nonvolatile memory,
wherein the controller transmits the second program corresponding to the first program having been read from the nonvolatile memory when the first program is installed within the IC.

4. A storage device according to claim 1, wherein:
the controller sends an encrypted program file encrypted in advance to the IC; and
the IC includes a decoding program, decodes by the decoding program the encrypted program file received from the controller to produce a decoded program file, and stores the decoded program file decoded by the decoding program.

5. A storage device according to claim 1, wherein:
the program which is to be executed by the IC and which is stored in the nonvolatile file includes a program which can be installed in the IC and a program which cannot be directly installed in the IC; and
the IC installs therein the program which can be installed in the IC and converts by the program installed in the IC the program which cannot be directly installed in the IC into a program which can be installed in the IC.

6. A storage device according to claim 1, wherein:
the program which is to be executed by the IC and which is stored in the nonvolatile file includes a program which can be installed in the IC and an encrypted program encrypted in advance; and
the IC installs therein the program which can be installed in the IC and decodes the encrypted program by the program installed in the IC.

7. The storage device according to claim 1, wherein the controller selects a program from the plurality of programs having been stored in the nonvolatile memory in accordance with an indication from the external device, and transmits the program selected to the IC.

8. The storage device according to claim 1, wherein the controller selects a program from the plurality of programs in the nonvolatile memory to send to the IC in case that the program is not active in the IC.

9. The storage device according to claim 1, wherein
the nonvolatile memory stores a list including identification information for each of the plurality of programs stored in the nonvolatile memory and state information for each of the plurality of programs,
wherein the state information for each of the plurality of programs indicates one of usable state, active state or unusable state, the usable state indicating that the program can be installed into the IC, the active state indicating that the program has been already installed into the IC and the unusable state indicating that the program can not be directly installed into the IC,
wherein the external device transmits a request to install the program within the IC with reference to information in the list.

10. The storage device according to claim 1, wherein the nonvolatile memory stores a first and a second program and information about an external device related to the second program, wherein the IC performs the first program corresponding to the second program in response to a command from the external device through the controller when the second program is performed by the external device.

11. The storage device according to claim 10, wherein the pair of program and information on an external device relates to a service performed by the external device.

12. The storage device according to claim 10, wherein the controller determines whether the external device indicates making the program to be performed in the IC active, deleting the program stored in the nonvolatile memory or transmitting the program stored in the nonvolatile memory to be performed by the external device to the external device, and accesses the nonvolatile memory and the IC in accordance with a result of the controller determining what the external device indicates.

13. The storage device according to claim 1, wherein the program to be performed by the IC comprises instructions which calculate the balance of electronic money.

14. The storage device according to claim 1, wherein the security processing relates to decoding secret information only with a predetermined permission.

15. The storage device according to claim 1, wherein the controller is further configured to perform authentication of the IC to validate the IC.

16. A memory card comprising:
an external interface to connect the memory card to an external device;
a nonvolatile memory chip in which a plurality of application programs have been stored in advance;
a controller chip separate from the nonvolatile memory chip for controlling the nonvolatile memory; and
an IC chip separate from the controller chip and the nonvolatile memory chip arranged to perform each of application programs stored in the nonvolatile memory, wherein the controller controls the nonvolatile memory to read from the nonvolatile memory, in response to an indication from the external device, a program to be executed by the IC and to install the program within the IC,
wherein the IC includes a CPU, PROM, and RAM and is connected to the nonvolatile memory through the controller,
wherein the controller is configured to be connected to the external interface, the nonvolatile memory, and the IC, to interpret a first instruction received from the external device through the external interface, and to access the nonvolatile memory or the IC in accordance with a result of the controller interpreting the first instruction;
wherein the controller further controls the IC to uninstall the program in response to a second indication from the external device.

17. An external device communicable with a storage device, comprising:
a first module for reading a list file of programs from the storage device provided within the storage device;
a second module for preparing a program list selectable from the list file;
a third module for selecting from the program list a program to be executed by the storage device, each of the programs in the program list being executable by the storage device; and
a fourth module for issuing a command to the storage device to execute the program selected by the third module, the command transmitting a program to the storage device to be executed by the storage device,
wherein the memory card comprises:
an external interface to connect the storage device to the external device;
a nonvolatile memory having stored therein a plurality of programs;
a controller for controlling the nonvolatile memory; and
an IC that can execute one of the programs;
wherein the controller is configured to perform authentication of the IC to validate the IC;
wherein the nonvolatile memory, the controller, and the IC are respectively formed as a separate semiconductor chips,
wherein the controller is configured to be connected to the external interface, the nonvolatile memory, and the IC, to interpret a first instruction received from the external device through the external interface, and to access the nonvolatile memory or the IC in accordance with a result of the controller interpreting the first instruction,
wherein the nonvolatile memory is connected to the controller and is configured to be capable of storing a plurality of programs which perform predetermined processing, including a security processing to be operable in the IC in cooperation with application programs in the external device,
wherein the IC includes a CPU, PROM, and RAM and is connected to the nonvolatile memory through the controller,
wherein the IC has a tamper-resistance stronger than a tamper-resistance of the controller and the nonvolatile memory,
wherein the controller is further configured to instruct the IC to run one program of the plurality of programs when the first instruction is interpreted as an access to the program, and transmit information on a performance result of the program to the external device, wherein the controller is further configured to determine validity of the IC and to transmit the program to the IC when the IC is determined to be valid, wherein the IC makes a check to determine the validity of the program received from the controller and installs the program in the IC when the program is determined to be valid.

18. The external device according to claim 17, wherein the controller is further configured to instruct the IC to uninstall the program in response to a second indication from the external device.

19. The external device according to claim 17, wherein the controller is further configured to perform authentication of the IC to validate the IC.

* * * * *